United States Patent
Phillips et al.

(10) Patent No.: US 8,105,560 B2
(45) Date of Patent: Jan. 31, 2012

(54) SYSTEM FOR TREATING A GAS STREAM

(75) Inventors: Paul Richard Phillips, Royston (GB);
Gudmund Smedler, Bleket (SE);
Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 12/995,307

(22) PCT Filed: May 29, 2009

(86) PCT No.: PCT/GB2009/050593
§ 371 (c)(1),
(2), (4) Date: Apr. 20, 2011

(87) PCT Pub. No.: WO2009/144509
PCT Pub. Date: Dec. 3, 2009

(65) Prior Publication Data
US 2011/0189068 A1    Aug. 4, 2011

(30) Foreign Application Priority Data

May 30, 2008 (GB) .................. 0809841.0

(51) Int. Cl.
*B01D 53/94* (2006.01)
*F01N 3/10* (2006.01)
(52) U.S. Cl. ............... 423/213.2; 423/213.5; 423/213.7; 423/215.5; 423/239.1; 60/299; 60/301; 60/317

(58) Field of Classification Search .................... 60/299, 60/301, 317; 423/213.2, 213.5, 213.7, 239.1, 423/215.5
See application file for complete search history.

(56) References Cited

U.S. PATENT DOCUMENTS

| 7,062,904 B1 | 6/2006 | Hu |
| 2003/0072694 A1 | 4/2003 | Hodgson |
| 2008/0041040 A1 | 2/2008 | During |
| 2010/0098612 A1* | 4/2010 | Lee et al. ............ 423/239.1 |
| 2010/0107610 A1 | 5/2010 | Schussler |
| 2011/0064633 A1* | 3/2011 | Huang et al. ............ 423/213.2 |
| 2011/0113761 A1* | 5/2011 | Boorse et al. ............ 60/297 |

FOREIGN PATENT DOCUMENTS

| DE | 10226975 | 1/2004 |
| DE | 20122744 | 6/2007 |
| EP | 0341832 | 11/1989 |
| EP | 1054722 | 12/2001 |
| EP | 1892396 | 2/2008 |
| WO | 2007098514 | 9/2007 |

OTHER PUBLICATIONS

International Search Report dated Sep. 7, 2009, application No. PCT/GB2009/050593.

* cited by examiner

*Primary Examiner* — Timothy Vanoy
(74) *Attorney, Agent, or Firm* — Kevin M. Carroll; RatnerPrestia

(57) ABSTRACT

A system for treating a gas stream containing nitrogen oxides ($NO_x$) and particulates flowing in the system comprises means for injecting a source of ammonia ($NH_3$) or urea ($CO(NH_2)_2$) into a flowing exhaust gas upstream of a precious metal-free particulate trap, a selective catalytic reduction catalyst disposed downstream of the particulate trap and a source of ammonia or urea.

6 Claims, 1 Drawing Sheet

DOC + Injection + Coated Mixer+ DPF + SCR (+ASC)

SYSTEM FOR TREATING A GAS STREAM

CROSS-REFERENCE TO RELATED APPLICATIONS

This application is the U.S. National Phase application of PCT International Application No. PCT/GB2009/050593, filed May 29, 2009, and claims priority of British Patent Application No. 0809841.0, filed May 30, 2008, the disclosures of both of which are incorporated herein by reference in their entirety for all purposes.

FIELD OF THE INVENTION

The present invention relates to a system for treating a gas stream containing nitrogen oxides ($NO_x$) and particulates flowing in the system, which system comprising means a particulate trap, a selective catalytic reduction (SCR) catalyst and a source of reductant.

BACKGROUND OF THE INVENTION

The selective catalytic reduction (SCR) of nitrogen oxides ($NO_x$), including nitrogen monoxide (also known as nitric oxide (NO)) and nitrogen dioxide ($NO_2$), to dinitrogen ($N_2$) with ammonia ($NH_3$) reductant using a suitable catalyst is well known from treating stationary source exhaust gas (power stations) and is beginning to be used in mobile (e.g. vehicular) applications and its use is set to increase in the near future.

EP 1054722 B1 claims a method of reducing pollutants, including particulates and $NO_x$, in gas streams, comprising passing such gas stream over an oxidation catalyst under conditions effective to convert at least a portion of NO in the gas stream to $NO_2$ and enhance the $NO_2$ content of the gas stream, removing at least a portion of said particulates in a particulate trap, reacting trapped particulate with $NO_2$, adding reductant fluid to the gas stream to form a gas mixture downstream of said trap, and passing the gas mixture over an SCR catalyst under $NO_x$ reduction conditions. The disclosure explains that the reductant fluid is suitably ammonia ($NH_3$) but ammonia precursors including urea, ammonium carbamate can also be considered.

EP 1054722 B1 also claims an improved system for treating combustion exhaust gas containing $NO_x$ and particulates, comprising in combination and in order, an oxidation catalyst effective to convert at least a portion of NO in said $NO_x$ to $NO_2$ and enhance the $NO_2$ content of the exhaust gas, a particulate trap, a source of reductant fluid, injection means for such reductant fluid located downstream of said particulate trap and an SCR catalyst.

EP 0341832 discloses a process for removing, by combustion, particulate deposited on a filter disposed in a diesel exhaust system, wherein exhaust gas containing NO is initially passed without filtering over a catalyst to convert the NO in the exhaust gas to $NO_2$ prior to filtering to remove particulate and wherein the exhaust gas containing $NO_2$ is then used to combust the particulate trapped on the filter, the amount of NO converted to $NO_2$ being sufficient to enable combustion of particulate trapped on filter to proceed at a temperature less than 400° C.

SUMMARY OF THE INVENTION

It is well known that urea has been suggested as a precursor for $NH_3$ for use in SCR of $NO_x$ in stationary and mobile (e.g. vehicular) applications. Urea hydrolyses at temperatures above about 160° C. according to equation (1) to liberate $NH_3$ itself.

$$CO(NH_2)_2 + H_2O \rightarrow 2NH_3 + CO_2 \quad (1)$$

Mechanisms for reducing $NO_x$ with $NH_3$ reductant using a suitable SCR catalyst are represented in equations (2), (3) and (4).

$$4NH_3 + 4NO + O_2 \rightarrow 4N_2 + 6H_2O \text{ (i.e. 1:1 } NH_3:NO) \quad (2)$$

$$4NH_3 + 2NO + 2NO_2 \rightarrow 4N_2 + 6H_2O \text{ (i.e. 1:1 } NH_3:NO_x) \quad (3)$$

$$8NH_3 + 6NO_2 \rightarrow 7N_2 + 12H_2O \text{ (i.e. 4:3 } NH_3:NO_x) \quad (4)$$

For a majority of current commercial SCR catalysts, it is understood that equation (3) is particularly desirable.

Undesirable competing, non-selective reactions with oxygen can produce secondary emissions or may unproductively consume $NH_3$. Two such non-selective reactions resulting in the complete oxidation of $NH_3$ are represented shown in equations (5) and (6).

$$4NH_3 + 5O_2 \rightarrow 4NO + 6H_2O \quad (5)$$

$$2NH_3 + 2NO_2 \rightarrow N_2O + 3H_2O + N_2 \quad (6)$$

In a development based on the method and system claimed in EP 1054722 B1, we now propose an alternative arrangement whereby a gas mixture comprising a gas stream and $NH_3$ is formed upstream of a particulate trap.

BRIEF DESCRIPTION OF THE DRAWINGS

In order that the invention may be more fully understood, an annotated drawing is provided by way of illustration, which we believe is self-explanatory, wherein.

DETAILED DESCRIPTION OF THE INVENTION

Figure 1:
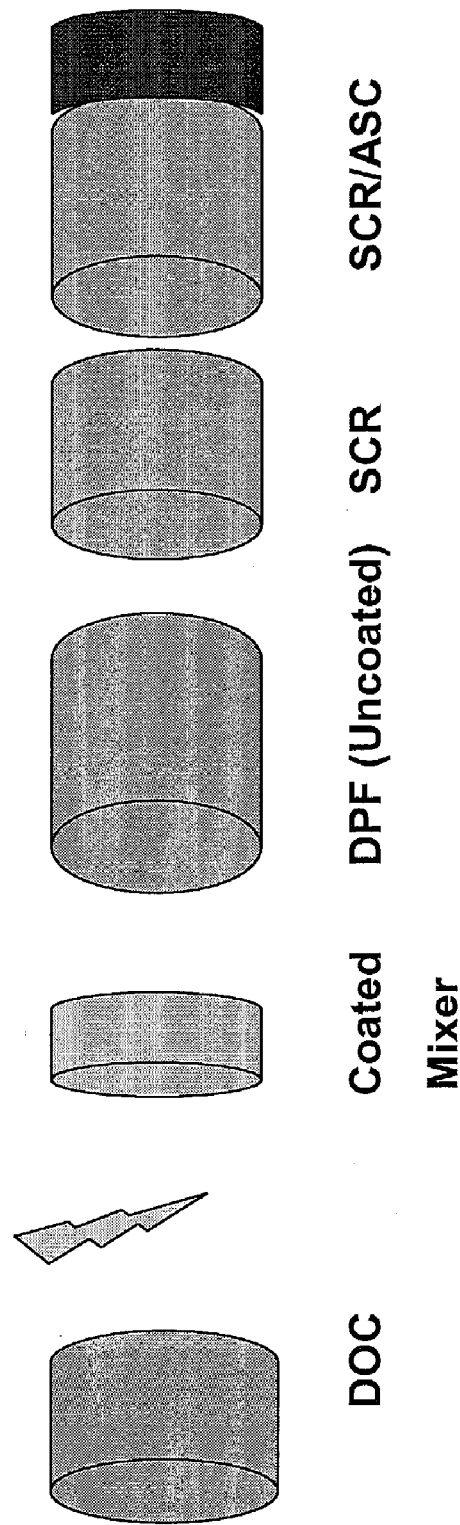
FIG. 1 shows a schematic drawing of a system according to one embodiment of the present invention.

According to one aspect the invention provides a system for treating a gas stream containing nitrogen oxides ($NO_x$) and particulates flowing in the system, which system comprising means for injecting a source of ammonia ($NH_3$) or urea ($CO(NH_2)_2$) into a flowing exhaust gas upstream of a precious metal-free particulate trap, a selective catalytic reduction catalyst disposed downstream of the particulate trap and a source of ammonia or urea.

In at least one embodiment, the system comprises a catalyst for oxidising NO to $NO_2$ disposed upstream of the injection means. Suitable catalysts include one or more platinum group metals, suitably platinum or both platinum and palladium supported on a metal oxide such as alumina.

Whether or not the NO oxidation catalyst is present in the system, a fluid mixing means can be disposed between the injection means and the particulate trap. Such a fluid mixing means can be of the static mixer, turbulator, a vortex generator type and suitable ones formed from metal are available from, e.g. Eberspaecher or Tenneco. However, at its simplest the fluid mixing means can be a relatively short length of flow-through substrate monolith.

Where the system uses a source of urea, the fluid mixing means can comprise a catalyst for hydrolysing urea to liberate ammonia. However, such catalyst is unnecessary where ammonia as such is injected into the gas stream. Alternatively to using a fluid mixing means, or additional thereto, the particulate trap, which comprises a plurality of inlet channels, which inlet channels having a length, can comprise a urea hydrolysis catalyst in a portion of the length of the plurality of inlet channels.

In another embodiment, wherein the system uses a source of urea or ammonia, the fluid mixing means can comprise a SCR catalyst, such as any of those described hereinbelow. It should be understood that SCR catalysts generally do hydrolyse urea as well as catalysing the reduction of $NO_x$ with $NH_3$. An advantage of this arrangement is that the system overall can remove more $NO_x$. Whilst it is acknowledged that removal of $NO_x$ upstream of the particulate trap may reduce the efficiency of the system for combusting trapped particulate in $NO_2$ according to the process disclosed in EP 0341832. it will also be understood that typically systems including such systems use regular forced or active regeneration strategies to ensure that the particulate trap is intermittently "cleaned". It will also be understood that removal of NO and/or $NO_2$ on a SCR catalyst disposed upstream of the filter can be used to adjust the $NO:NO_2$ ratio so that it is most suitable for efficient $NO_x$ reduction on the SCR catalyst downstream of the particulate trap, e.g. according to any of equations (2), (3) and (4), i.e. the $NO:NO_2$ ratio may be adjusted to the most beneficial such ratio for the particular SCR catalyst. In this regard, the SCR catalyst upstream of the particulate trap may be the same or different from the SCR catalyst downstream of the particulate trap.

Suitable urea hydrolysis catalysts include stabilised $TiO_2$, such as $WO_x/TiO_2$. In any event, it is highly desirable that the hydrolysis catalyst selected substantially does not oxidise $NH_3$.

The SCR catalyst for use in the present invention can be coated onto a flow-through monolith substrate or a filter substrate or can be of the extruded type. Suitable catalysts include transition metal/zeolites e.g. Cu/ZSM-5 or Fe/Beta; vanadia-based catalysts such as $V_2O_5/WO_3/TiO_2$; or non-zeolite transition metal catalysts such as $Fe/WO_x/ZrO_2$.

In a further aspect, the invention provides a vehicle comprising a system according to the invention.

According to a further aspect, the invention provides a method of treating pollutants, including particulates and nitrogen oxides ($NO_x$) in gas streams, comprising adding ammonia or urea to the gas stream to form a gas mixture upstream of a precious metal-free particulate trap, removing at least a portion of said particulates in the particulate trap and passing the gas mixture over an SCR catalyst under conditions for reducing $NO_x$ in the gas mixture.

In one embodiment using urea, the method comprises the step of hydrolysing urea to liberate ammonia using a catalyst disposed in inlet channels of the particulate trap.

According to a further aspect, the invention provides a method of treating pollutants, including particulates and nitrogen oxides ($NO_x$) in gas streams, comprising passing such gas stream over an oxidation catalyst under conditions effective to convert at least a portion of NO in the gas stream to $NO_2$ thereby to enhance the $NO_2$ content of the gas stream, removing at least a portion of said particulates in a precious metal-free particulate trap, reacting trapped particulate with $NO_2$, adding ammonia to the gas stream to form a gas mixture upstream of the particulate trap, and passing the gas mixture over an SCR catalyst under conditions for reducing $NO_x$ in the gas mixture.

In a further aspect, the invention provides a method of treating pollutants, including particulates and nitrogen oxides ($NO_x$), in gas streams, comprising passing such gas stream over an oxidation catalyst under conditions effective to convert at least a portion of NO in the gas stream to $NO_2$ thereby to enhance a $NO_2$ content of the gas stream, removing at least a portion of said particulates in a precious metal-free particulate trap, reacting trapped particulate with $NO_2$, adding urea to the gas stream upstream of the particulate trap, hydrolysing the urea to form a gas mixture including ammonia and the gas stream upstream of said trap, and passing the gas mixture over an SCR catalyst under conditions for reducing $NO_x$ in the gas mixture.

The invention claimed is:

1. A system for treating a gas stream containing nitrogen oxides ($NO_x$) and particulates flowing in the system, which system comprising means for injecting a source of ammonia ($NH_3$) or urea ($CO(NH_2)_2$) into a flowing exhaust gas upstream of a precious metal-free particulate trap, a second selective catalytic reduction (SCR) catalyst disposed downstream of the particulate trap and a source of ammonia or urea, wherein (1) a fluid mixing means is disposed between the injection means and the particulate trap and the fluid mixing means comprises a first SCR catalyst, or (2) the particulate trap comprises a plurality of inlet channels, which inlet channels having a length, and wherein a portion of the length of the plurality of inlet channels comprises a first SCR catalyst.

2. A system according to claim 1, comprising a catalyst for oxidising NO to $NO_2$ disposed upstream of the injection means.

3. A system according to claim 1, wherein the first SCR catalyst is selected from the group consisting of a transition metal/zeolite, $V_2O_5/WO_2/TiO_2$, and $Fe/WO_x/ZrO_2$.

4. A method of treating pollutants, including particulates and nitrogen oxides ($NO_x$) in gas streams, comprising adding ammonia or urea to the gas stream to form a gas mixture upstream of a precious metal-free particulate trap, removing at least a portion of said particulates in the particulate trap and passing the gas mixture over a second SCR catalyst under conditions for reducing $NO_x$ in the gas mixture wherein (1) a fluid mixing means comprising a first SCR catalyst is disposed upstream of the particulate trap, or (2) the particulate trap comprises a plurality of inlet channels, which inlet channels having a length, and wherein a portion of the length of the plurality of inlet channels comprises a first SCR catalyst.

5. The method according to claim 4, comprising passing the gas stream over an oxidation catalyst under conditions effective to convert at least a portion of NO in the gas stream to $NO_2$ thereby to enhance a $NO_2$ content of the gas stream, prior to adding ammonia or urea to the gas stream.

6. The method according to claim 4, wherein the first SCR catalyst is selected from the group consisting of a transition metal/zeolite, $V_2O_5/WO_2/TiO_2$, and $Fe/WO_x/ZrO_2$.

\* \* \* \* \*

(12) EX PARTE REEXAMINATION CERTIFICATE (9937th)
United States Patent
Phillips et al.

(10) Number: US 8,105,560 C1
(45) Certificate Issued: Nov. 13, 2013

(54) SYSTEM FOR TREATING A GAS STREAM

(75) Inventors: Paul Richard Phillips, Royston (GB); Gudmund Smedler, Bleket (SE); Martyn Vincent Twigg, Cambridge (GB)

(73) Assignee: Johnson Matthey Public Limited Company, London (GB)

Reexamination Request:
No. 90/012,576, Sep. 14, 2012

Reexamination Certificate for:
Patent No.: 8,105,560
Issued: Jan. 31, 2012
Appl. No.: 12/995,307
Filed: Apr. 20, 2011

(21) Appl. No.: 90/012,576

(22) PCT Filed: May 29, 2009

(86) PCT No.: PCT/GB2009/050593
§ 371 (c)(1),
(2), (4) Date: Apr. 20, 2011

(87) PCT Pub. No.: WO2009/144509
PCT Pub. Date: Dec. 3, 2009

(30) Foreign Application Priority Data

May 30, 2008 (GB) .................................. 0809841

(51) Int. Cl.
*B01D 53/94* (2006.01)
*F01N 3/10* (2006.01)

(52) U.S. Cl.
USPC ................. 423/213.2; 423/213.5; 423/213.7; 423/215.5; 423/239.1; 60/299; 60/301; 60/317

(58) Field of Classification Search
None
See application file for complete search history.

(56) References Cited

To view the complete listing of prior art documents cited during the proceeding for Reexamination Control Number 90/012,576, please refer to the USPTO's public Patent Application Information Retrieval (PAIR) system under the Display References tab.

*Primary Examiner* — Alan Diamond

(57) ABSTRACT

A system for treating a gas stream containing nitrogen oxides ($NO_x$) and particulates flowing in the system comprises means for injecting a source of ammonia ($NH_3$) or urea ($CO(NH_2)_2$) into a flowing exhaust gas upstream of a precious metal-free particulate trap, a selective catalytic reduction catalyst disposed downstream of the particulate trap and a source of ammonia or urea.

DOC + Injection + Coated Mixer+ DPF + SCR (+ASC)

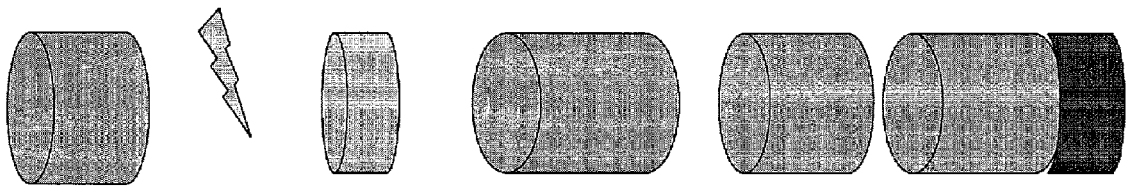

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*